United States Patent
Gealy et al.

(10) Patent No.: US 10,786,777 B2
(45) Date of Patent: Sep. 29, 2020

(54) COMPACT DESICCANT AIR BREATHER WITH UNIDIRECTIONAL AIR FLOW

(71) Applicant: Schroeder Industries, LLC, Leetsdale, PA (US)

(72) Inventors: Preston L. Gealy, New Castle, PA (US); David L. Cowder, Coraopolis, PA (US); Lisa Langhorst, Oakland, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 658 days.

(21) Appl. No.: 15/620,223

(22) Filed: Jun. 12, 2017

(65) Prior Publication Data

US 2017/0354917 A1    Dec. 14, 2017

Related U.S. Application Data

(60) Provisional application No. 62/348,479, filed on Jun. 10, 2016.

(51) Int. Cl.
| | | |
|---|---|---|
| *B01D 53/02* | (2006.01) | |
| *B01D 53/04* | (2006.01) | |
| *B01D 51/00* | (2006.01) | |
| *B01D 53/26* | (2006.01) | |

(52) U.S. Cl.
CPC ......... *B01D 53/0446* (2013.01); *B01D 51/00* (2013.01); *B01D 53/261* (2013.01); *B01D 2253/106* (2013.01); *B01D 2257/80* (2013.01); *B01D 2259/401* (2013.01); *B01D 2259/4525* (2013.01)

(58) Field of Classification Search
CPC .......... B01D 2253/106; B01D 2257/80; B01D 2259/40003; B01D 2259/401; B01D 2259/4525; B01D 51/00; B01D 53/0446; B01D 53/261

See application file for complete search history.

(56) References Cited

U.S. PATENT DOCUMENTS

| | | | | |
|---|---|---|---|---|
| 4,247,311 | A | * 1/1981 | Seibert ............... | B01D 53/0446 96/111 |
| 4,692,175 | A | * 9/1987 | Frantz .................... | B01D 29/23 96/408 |
| 4,713,094 | A | * 12/1987 | Yanagawa ............ | B01D 53/261 55/DIG. 17 |

(Continued)

*Primary Examiner* — Christopher P Jones
(74) *Attorney, Agent, or Firm* — Blynn L. Shideler; Krisanne Shideler; BLK Law Group

(57) ABSTRACT

A compact desiccant air breather with unidirectional air flow comprises a housing with a plurality of air inlets adjacent an upper end for air intake. A desiccant bed of water absorbing material is within the intake flow path of air and an air chamber is within the intake flow path of air downstream of the desiccant bed. A one-way inflow check valve is adjacent the desiccant bed between the desiccant bed and the air chamber and is configured to allow airflow from the desiccant bed material to the air chamber and to prevent reverse airflow. A coupling member has an air flow conduit therethrough which is in fluid communication with the air chamber and forms an air intake flow path exit. A one-way exhaust check valve in fluid communication with the air chamber is configured to allow airflow from the air chamber to the exterior and to prevent reverse flow.

16 Claims, 1 Drawing Sheet

(56) References Cited

U.S. PATENT DOCUMENTS

| | | | | |
|---|---|---|---|---|
| 5,002,593 | A * | 3/1991 | Ichishita | B60T 17/004 96/137 |
| 5,252,034 | A * | 10/1993 | Sweet | B01D 46/30 417/279 |
| 5,427,609 | A * | 6/1995 | Zoglman | B01D 53/0415 95/98 |
| 5,607,500 | A * | 3/1997 | Shamine | B60T 17/004 96/144 |
| 5,673,493 | A * | 10/1997 | Kazakis | B01D 53/261 34/209 |
| 5,792,245 | A * | 8/1998 | Unger | B60T 17/004 96/137 |
| 5,851,269 | A * | 12/1998 | Strope | B01D 53/0446 96/144 |
| 6,568,100 | B1 * | 5/2003 | Fielding | B01D 53/0446 34/109 |
| 7,625,437 | B2 * | 12/2009 | Heer | B01D 53/0415 55/309 |
| 8,585,809 | B2 * | 11/2013 | Clair | B01D 53/0415 55/417 |
| 9,457,954 | B2 * | 10/2016 | Anderson | B01D 53/261 |
| 2004/0094036 | A1 * | 5/2004 | Nichols | B01D 53/261 95/148 |
| 2007/0144350 | A1 * | 6/2007 | Paling | B60T 17/004 96/134 |
| 2007/0180999 | A1 * | 8/2007 | Paling | B01D 53/261 96/134 |
| 2013/0025454 | A1 * | 1/2013 | Moredock | B01D 50/002 95/268 |
| 2013/0112700 | A1 * | 5/2013 | Anderson | B01D 53/261 220/745 |

* cited by examiner

COMPACT DESICCANT AIR BREATHER WITH UNIDIRECTIONAL AIR FLOW

CROSS-REFERENCE TO RELATED APPLICATION

This application claims the benefit of U.S. Provisional Patent Application Ser. No. 62/348,479, entitled "Compact Desiccant Air Breather with Unidirectional Air Flow", filed on Jun. 10, 2016, which is incorporated herein by reference.

BACKGROUND OF THE INVENTION

1. Field of the Invention

We, Preston L. Gealy, David L. Cowder and Lisa Langhorst have developed new improvements relating generally to desiccant air breather, more specifically to a compact desiccant air breather with unidirectional air flow.

2. Description of Related Art

All fluid containing reservoirs need air space to account for air exchange during relative filling or emptying of the reservoir or tank as well as to account for thermal expansion and contraction of the fluid and housing. Breather vents allow air movement and generally equalize the pressure with ambient conditions.

The breather vents within this discussion are not limited breather vents on fluid containing reservoirs, but can include breather vents on other closed mechanical systems as well.

Breather vents have been designed with inlets on the side of the breather vent mechanism, or on the bottom thereof, to prevent unwanted material, e.g., rainwater, from falling into the breather vent and contaminating the associated reservoir or system. This aspect of breather vent mechanism may be as simple as a turn down pipe (sometimes called a candy-cane pipe due to the shape), or vent cover. These solutions are found in conventional dust caps and breather caps found in many designs.

Moving the vent inlet from the top of the mechanism does minimize rain and other falling debris from entering the associated reservoir (and/or the associated system), but does not remove small particulates or water vapor in the intake air that can contaminate the reservoir or system. The desiccant air breather addresses these concerns and replaces the standard dust cap or OEM breather cap on equipment, offering better filtration to protect against even the smallest particulates that destroy the effectiveness of the associated machinery, and cause downtime and costly repairs for the associated system. As air is drawn into equipment through the desiccant air breather, the layered desiccant filter elements remove particulate while the desiccant beads strip harmful moisture.

Prior art FIG. 1 is a sectional schematic view of a conventional air desiccant breather. The conventional desiccant air breather as shown in FIG. 1 includes a plurality of air inlets and outlets on the bottom of the device which are sized according to flow requirements. Incoming air will then come to a foam pad that generally disperses fair flow evenly and can absorb some oil mist and large particulates that may be present. The foam layers also accommodate swelling of the desiccant or other absorbing material. The incoming air then passes through a particulate filter media layer designed to filter out particulates greater than the designated size of the media. The incoming air then comes to a water absorbing bed or desiccant bed generally formed of silica gel beads or the like. Adjacent the desiccant bed may be a bed of secondary absorbent for other desired materials such as an activated carbon bed. A second foam layer and a final filter particulate complete the annular air treating structure of the breather and leads to the central air conduit that is coupled to the reservoir or system through a threaded connection.

The conventional desiccant air breather as shown in FIG. 1 is designed with bi-directional flow to accommodate air intake and air exhaust from the system. Bidirectional flow within the meaning of this application is defined in that the flow path is the same in either intake or exhaust mode, differing only in direction. For this reason the conventional desiccant air breather includes particulate filters and foams on either side of the desiccant beds, preventing the system from being designed compact. Additionally the bi-directional flow through the desiccant and filters will shorten the effective life of each element and thus of the breather overall.

There is a need for a simple compact desiccant air breather that addresses these issues with the prior art desiccant air breathers.

SUMMARY OF THE INVENTION

The present invention provides a compact desiccant air breather with unidirectional air flow comprising a housing; at least one air inlet extending through the housing adjacent an upper end of the housing for air intake through the breather; a desiccant bed of water absorbing material within housing and within the intake flow path of air coming through the breather; an air chamber within the housing and within the intake flow path of air coming through the breather in a position downstream of the desiccant bed of water absorbing material; at least one one-way inflow check valve adjacent the desiccant bed of water absorbing material and within the intake flow path of air between the desiccant bed of water absorbing material and the air chamber, wherein the one-way inflow check valve is configured to allow air to flow from the desiccant bed of water absorbing material to the air chamber and to prevent flow from the air chamber to the desiccant bed of water absorbing material; a coupling member with an air flow conduit there-through in fluid communication with the air chamber, wherein the air intake flow path of air coming through the breather exits the breather through the air flow conduit; and a one-way exhaust check valve on the housing and in fluid communication with the air chamber, wherein the one-way exhaust check valve is configured to allow air to flow from the air chamber to the exterior of the housing during exhaust flow and to prevent flow from the exterior of the housing into the air chamber, whereby the exhaust flow path through the breather is through the air flow conduit of the coupling member into the air chamber and through the one-way exhaust check valve on the housing.

These and other advantages of the present invention will be clarified in the detailed description of the preferred embodiments taken together with the associated figures.

DETAILED DESCRIPTION OF THE INVENTION

It is noted that, as used in this specification and the appended claims, the singular forms "a," "an," and "the"

include plural referents unless expressly and unequivocally limited to one referent. The various embodiments and examples of the present invention as presented herein are each understood to be non-limiting with respect to the scope of the invention.

Figure 1:
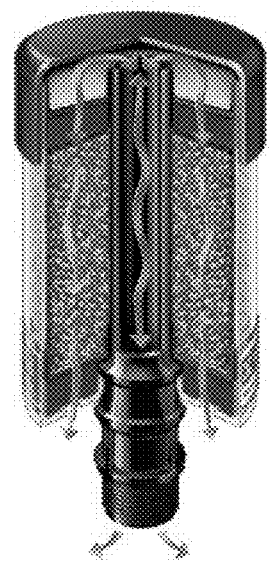
FIG. 1 is a schematic perspective partially section view of a conventional bi-directional desiccant air breather.
Figure 2:
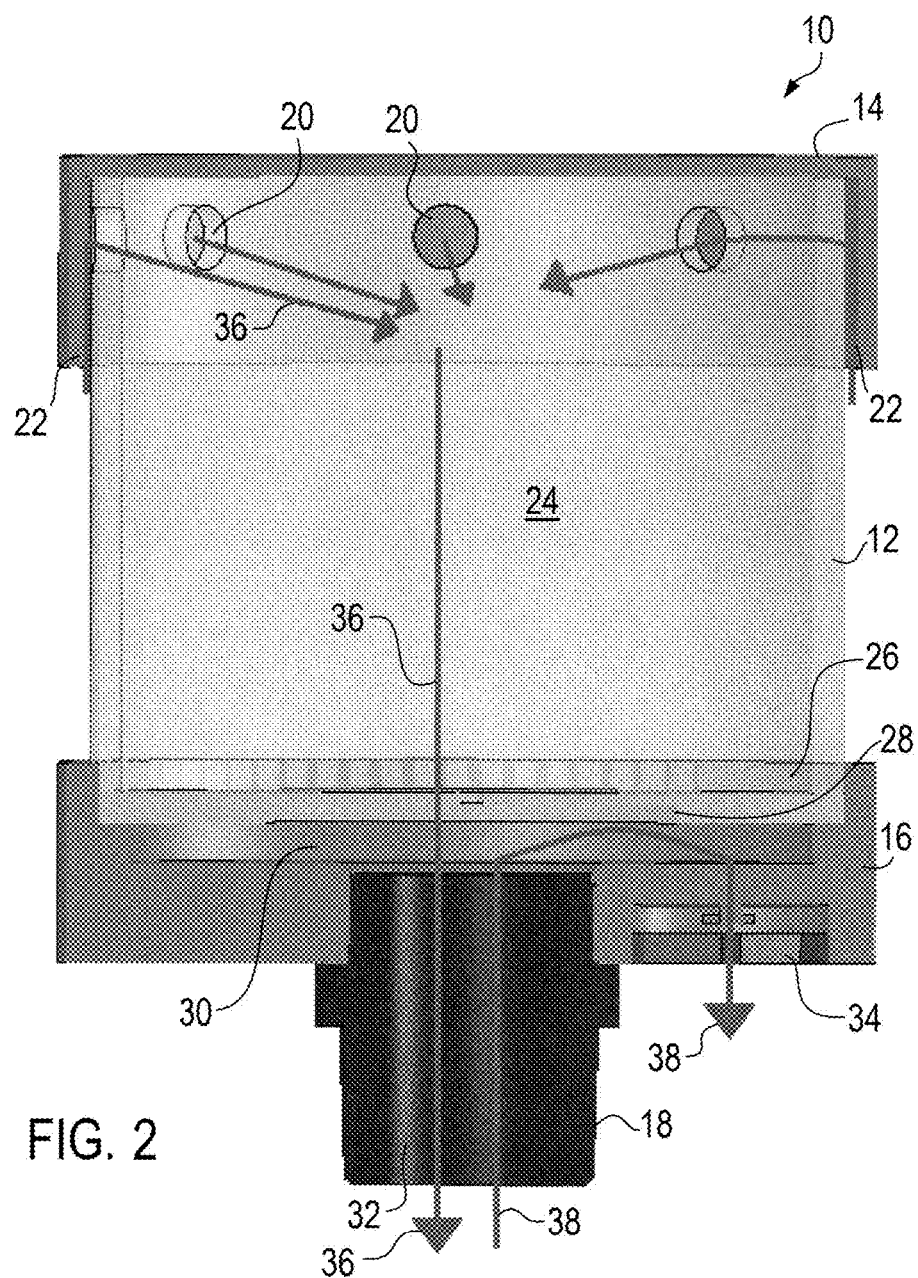
FIG. 2 is a schematic elevation section view of a compact desiccant air breather 10 according to one embodiment of the present invention.

FIG. 2 is a schematic section elevation view of a compact desiccant air breather 10 according to one embodiment of the present invention.

The present invention is a compact desiccant air breather 10 with unidirectional air flow. The compact desiccant air breather 10 according to the present invention includes a housing formed by a cylindrical body 12 extending between and attached to an upper inlet endcap 14 and a lower exhaust endcap 16. A coupling member 18 is attached to the lower exhaust endcap 16 and includes a threaded connection on an exterior portion thereof The housing can be formed of any conventional materials such as polycarbonate (such as for the body 12), nylon (such as for end caps 14 and 16 and coupler 18), polyethylene, or PET.

The compact desiccant air breather 10 according to the present invention includes at least one and preferably a plurality of air inlets 20 extending through the body 12 of the housing adjacent an upper end of the housing for air intake through the breather 10. The air inlets 20 are generally equally circumferentially spaced about the cylindrical housing with the total area of the openings forming the air inlets 20 generally determined by the desired flow rate through the breather 10. The upper inlet endcap 14 includes an outer cylindrical flange spaced from the body 12 defining an annular flow path 22 extending to the plurality of air inlets 20, whereby the endcap 14 with flange prevent rain and/or falling debris from directly entering the air inlets 20.

The compact desiccant air breather 10 according to the present invention includes a desiccant bed of water absorbing material 24 within the body 12 of the housing and within the intake flow path 36 of air coming through the breather. The body 12 includes a floor 26 with openings therein defining part of the flow path 36, with the floor 26 supporting the elements forming the desiccant bed of water absorbing material 24, such as silica gel beads which have a diameter larger than the openings in the floor 26. The beads individually are not illustrated in the figure for clarity. The intake path 36 through the material 24 is a tortuous path about the various beads forming the material 24 as known in the art. Any known desiccant material may be utilized, and a foam base may be added if the desired particle size is smaller than the openings in the floor 26.

Additionally, the breather 10 may include other treatment elements immediately before the desiccant bed of water absorbing material within the body 12, such as a particulate filter element between air inlets 20 and the desiccant bed of water absorbing material 24 to filter out large particulates or a foam element between air inlets 20 and the desiccant bed of water absorbing material 24 to distribute the air flow 36 across the interior of the housing. A foam element can also be used to retain material such as oil mist in the incoming air and can serve to allow for some expansion of the material 24. Other treating beds may be implemented as desired, such as an activated carbon layer for removal of other desired contaminants, if needed.

The compact desiccant air breather 10 according to the present invention includes an air chamber 30 within the lower exhaust endcap 16 of the housing below the floor 26. The air chamber 20 is within the intake flow path 36 of air coming through the breather 10 in a position downstream of the desiccant bed of water absorbing material 24. As discussed below, the air chamber 30 within the lower exhaust endcap 16 of the housing is also within the exhaust flow path 38 of air coming through the breather 10.

The compact desiccant air breather 10 according to the present invention includes at least one one-way inflow check valve 28 adjacent the desiccant bed of water absorbing material 24 coupled to the floor 26. The one-way inflow check valve 28 is within the intake flow path 36 of air between the desiccant bed of water absorbing material 24 and the air chamber 30.

The one-way inflow check valve 28 is a diaphragm check valve on the lower side of floor 26, wherein the one-way inflow check valve 28 is configured to allow inlet air to flow from the desiccant bed of water absorbing material 24 to the air chamber 30 and to prevent flow from the air chamber 30 to the desiccant bed of water absorbing material 24 creating the unidirectional flow through the breather 10.

The figure shows a single one-way inflow check valve 28, but the invention contemplates a number of smaller valves 28 of smaller diameter spaced about the floor 26, specifically three valves 28 sized similar to the exhaust valve 34 discussed below (thereby reducing the distinct construction parts) spaced 120 degrees apart and wherein these would be offset, in plan view, from the position of the exhaust valve 34.

The coupling member 18 defines an air flow conduit 32 there-through in fluid communication with the air chamber 30, wherein the air intake flow path 36 of air coming through the breather 10 exits the breather 10 through the air flow conduit 32, and the air exhaust flow path 38 of air coming through the breather 10 enters the breather 10 through the air flow conduit 32.

The compact desiccant air breather 10 according to the present invention includes a one-way exhaust check valve 34 on the lower exhaust endcap 16 of housing and in fluid communication with the air chamber 30. The one-way exhaust check valve 34 is a diaphragm check valve on the lower side of lower exhaust cap 16, which will include a mount with openings to accommodate the check valve 34 and the flow 38 there-through. The one-way exhaust check valve 34 is configured to allow air to flow from the air chamber 30 to the exterior of the housing of the breather 10 and to prevent flow from the exterior of the housing of the breather 30 into the air chamber 30. The exhaust flow path 38 through the breather 10 is through the air flow conduit 32 of the coupling member 18 into the air chamber 30 and through the one-way exhaust check valve 34.

The present invention provides a compact desiccant air breather 10 with unidirectional air flow. Unidirectional air flow through the compact desiccant air breather 10 within this application means air flow through the material 24. The flow path 36 through the material 24 (and filter and other treating elements or layers if present) is only in one direction extending the useful life of the material 24. The breather 10 is compact due to the use of diaphragm check valves 28 and 34. The design is efficient and cost effective.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

What is claimed is:

1. A compact desiccant air breather with unidirectional air flow comprising:
    a housing wherein the housing includes an upper endcap with an outer flange;
    at least one valve-less air inlet extending through the housing adjacent an upper end of the housing for air intake through the breather within an intake flow path of air coming through the breather, wherein the outer flange defines an annular flow path extending to the at least one air inlet;
    a desiccant bed of water absorbing material within housing and within the intake flow path of air coming through the breather and wherein no valves are provided in the intake flow path between the annular flow path and the desiccant bed of water absorbing material;
    an air chamber within the housing and within the intake flow path of air coming through the breather in a position downstream of the desiccant bed of water absorbing material;
    at least one one-way inflow check valve adjacent the desiccant bed of water absorbing material and within the intake flow path of air between the desiccant bed of water absorbing material and the air chamber, wherein the one-way inflow check valve is configured to allow air to flow from the desiccant bed of water absorbing material to the air chamber and to prevent flow from the air chamber to the desiccant bed of water absorbing material;
    a coupling member with an air flow conduit there-through in fluid communication with the air chamber, wherein the air intake flow path of air coming through the breather exits the breather through the air flow conduit; and
    at least one one-way exhaust check valve on the housing and in fluid communication with the air chamber, wherein the one-way exhaust check valve is configured to allow air to flow from the air chamber to the exterior of the housing and to prevent flow from the exterior of the housing into the air chamber, whereby an exhaust flow path through the breather is through the air flow conduit of the coupling member into the air chamber and through the one-way exhaust check valve on the housing, and wherein the one-way exhaust check valve is positioned on the housing whereby flow through the one-way exhaust check valve in the exhaust flow path is parallel to flow within the coupling member and within the annular flow path.

2. The compact desiccant air breather with unidirectional air flow according to claim 1 wherein at least three circular air inlets are provided.

3. The compact desiccant air breather with unidirectional air flow according to claim 2 wherein the housing is generally cylindrical and the air inlets are circumferentially spaced about the cylindrical housing.

4. The compact desiccant air breather with unidirectional air flow according to claim 1 further including a particulate filter element between air inlets and the desiccant bed of water absorbing material.

5. The compact desiccant air breather with unidirectional air flow according to claim 1 further including a foam element between air inlets and the one-way inflow check valve.

6. The compact desiccant air breather with unidirectional air flow according to claim 1 wherein the desiccant bed of water absorbing material includes silica gel beads.

7. The compact desiccant air breather with unidirectional air flow according to claim 1 wherein the one-way inflow check valve is a diaphragm check valve.

8. The compact desiccant air breather with unidirectional air flow according to claim 1 wherein the coupling member includes a threaded connection on an exterior portion thereof.

9. The compact desiccant air breather with unidirectional air flow according to claim 1 wherein the one-way exhaust check valve is a diaphragm check valve.

10. A compact desiccant air breather with unidirectional air flow comprising:
    a housing formed by a cylindrical body with a floor extending between and attached to an upper inlet endcap with an outer flange and a lower exhaust endcap;
    at least one valve-less air inlet extending through the housing adjacent an upper end of the housing for air intake through the breather wherein the outer flange defines an annular flow path extending to the at least one valve-less air inlet;
    a desiccant bed of water absorbing material within housing supported on the floor of the cylindrical body, and wherein no valves are provided in an intake flow path between the annular flow path and the desiccant bed of water absorbing material;
    an air chamber within the housing below the floor of the cylindrical body;
    at least one one-way inflow check valve between the desiccant bed of water absorbing material and the air chamber, wherein the one-way inflow check valve is configured to allow air to flow from the desiccant bed of water absorbing material to the air chamber and to prevent flow from the air chamber to the desiccant bed of water absorbing material;
    a coupling member with an air flow conduit there-through attached to the lower exhaust endcap and in fluid communication with the air chamber; and
    at least one one-way exhaust check valve on the lower exhaust endcap and in fluid communication with the air chamber, wherein the one-way exhaust check valve is configured to allow air to flow from the air chamber to the exterior of the housing and to prevent flow from the exterior of the housing into the air chamber, and wherein the one-way exhaust check valve is positioned on the housing whereby flow through the one-way exhaust check valve is parallel to flow within the coupling member and within the annular flow path.

11. The compact desiccant air breather with unidirectional air flow according to claim 10 wherein at least three circular air inlets are provided.

12. The compact desiccant air breather with unidirectional air flow according to claim 11 wherein the the air inlets are circumferentially spaced about the cylindrical housing.

13. The compact desiccant air breather with unidirectional air flow according to claim 10 wherein the desiccant bed of water absorbing material includes silica gel beads.

14. The compact desiccant air breather with unidirectional air flow according to claim 10 wherein the one-way inflow check valve is a diaphragm check valve.

15. The compact desiccant air breather with unidirectional air flow according to claim 14 wherein the coupling member includes a threaded connection on an exterior portion thereof, and further including a particulate filter element between air inlets and the desiccant bed of water absorbing material.

16. The compact desiccant air breather with unidirectional air flow according to claim 14 wherein the one-way exhaust check valve is a diaphragm check valve.

* * * * *